United States Patent
Behzad et al.

(10) Patent No.: US 8,107,442 B2
(45) Date of Patent: Jan. 31, 2012

(54) MASTER/SLAVE OSCILLATION PRODUCTION AND DISTRIBUTION IN A MULTIPLE RF TRANSCEIVER SYSTEM SUPPORTING MIMO OPERATIONS

(75) Inventors: Arya Reza Behzad, Poway, CA (US); Jason A. Trachewsky, Menlo Park, CA (US); R. Tushar Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1087 days.

(21) Appl. No.: 11/168,733

(22) Filed: Jun. 28, 2005

(65) Prior Publication Data

US 2006/0221905 A1 Oct. 5, 2006

Related U.S. Application Data

(60) Provisional application No. 60/668,047, filed on Apr. 4, 2005.

(51) Int. Cl.
*H04B 7/216* (2006.01)

(52) U.S. Cl. ..................... 370/335; 455/550.1
(58) Field of Classification Search .................. 455/141, 455/146, 147, 337–339; 370/335, 503, 510–512, 370/375, 520, 395.62, 356, 509; 331/2
See application file for complete search history.

(56) References Cited

U.S. PATENT DOCUMENTS

| | | | |
|---|---|---|---|
| 7,609,792 B2* | 10/2009 | Palaskas et al. | 375/347 |
| 7,840,228 B2* | 11/2010 | Suemitsu et al. | 455/502 |
| 2004/0264478 A1* | 12/2004 | Van Der Valk et al. | 370/395.62 |
| 2005/0064892 A1* | 3/2005 | Cavin | 455/550.1 |
| 2006/0072514 A1* | 4/2006 | Kent et al. | 370/335 |
| 2006/0198476 A1* | 9/2006 | Palaskas et al. | 375/347 |
| 2009/0002225 A1* | 1/2009 | McBurney et al. | 342/357.1 |

* cited by examiner

*Primary Examiner* — Kamran Afshar
*Assistant Examiner* — Khawar Iqbal
(74) *Attorney, Agent, or Firm* — Garlick Harrison & Markison; Kevin L. Smith

(57) ABSTRACT

A multiple input multiple output (MIMO) RF transceiver system includes a plurality of RF transceiver ICs, a crystal, and master oscillation coupling. Each of the plurality of RF transceiver ICs includes crystal oscillator circuitry. Crystal oscillator circuitry of the first RF transceiver IC and a crystal are operable to produce a master oscillation. Master oscillation coupling couples the master oscillation produced by the first RF transceiver IC to the at least one other RF transceiver IC. In one embodiment, the master oscillation is passed from the first RF transceiver IC to each other transceiver RF ICs. In another embodiment, the master oscillation is used to produce a slave oscillation at a second RF transceiver IC and subsequent RF transceiver ICs produce there own slave oscillation based upon a slave oscillation received from a prior RF transceiver IC.

14 Claims, 7 Drawing Sheets

MASTER/SLAVE OSCILLATION PRODUCTION AND DISTRIBUTION IN A MULTIPLE RF TRANSCEIVER SYSTEM SUPPORTING MIMO OPERATIONS

CROSS REFERENCE TO RELATED APPLICATION

This application claims priority to U.S. Provisional Patent Application Ser. No. 60/668,047, filed Apr. 4, 2005, expired, which is incorporated herein by reference for all purposes.

BACKGROUND OF THE INVENTION

1. Technical Field of the Invention

This invention relates generally to communication circuitry and more particularly to radio frequency integrated circuits that may be used within a wireless communication device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11 (Wireless Local Area Networks "WLANs"), Bluetooth (Wireless Personal Area Networks), advanced mobile phone services (AMPS), digital AMPS, global system for mobile communications (GSM), code division multiple access (CDMA), time division multiple access (TDMA), frequency division multiple access (FDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Developing operating standards require Multiple Input Multiple Output (MIMO) operations in which multiple receivers and/or multiple transmitters of an RF transceiver system operate simultaneously in a common band. Synchronization in time of multiple RF transceivers servicing MIMO communications is required and difficult to accomplish. Therefore, a need exists for the synchronization in time of multiple RF transceivers supporting MIMO operations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
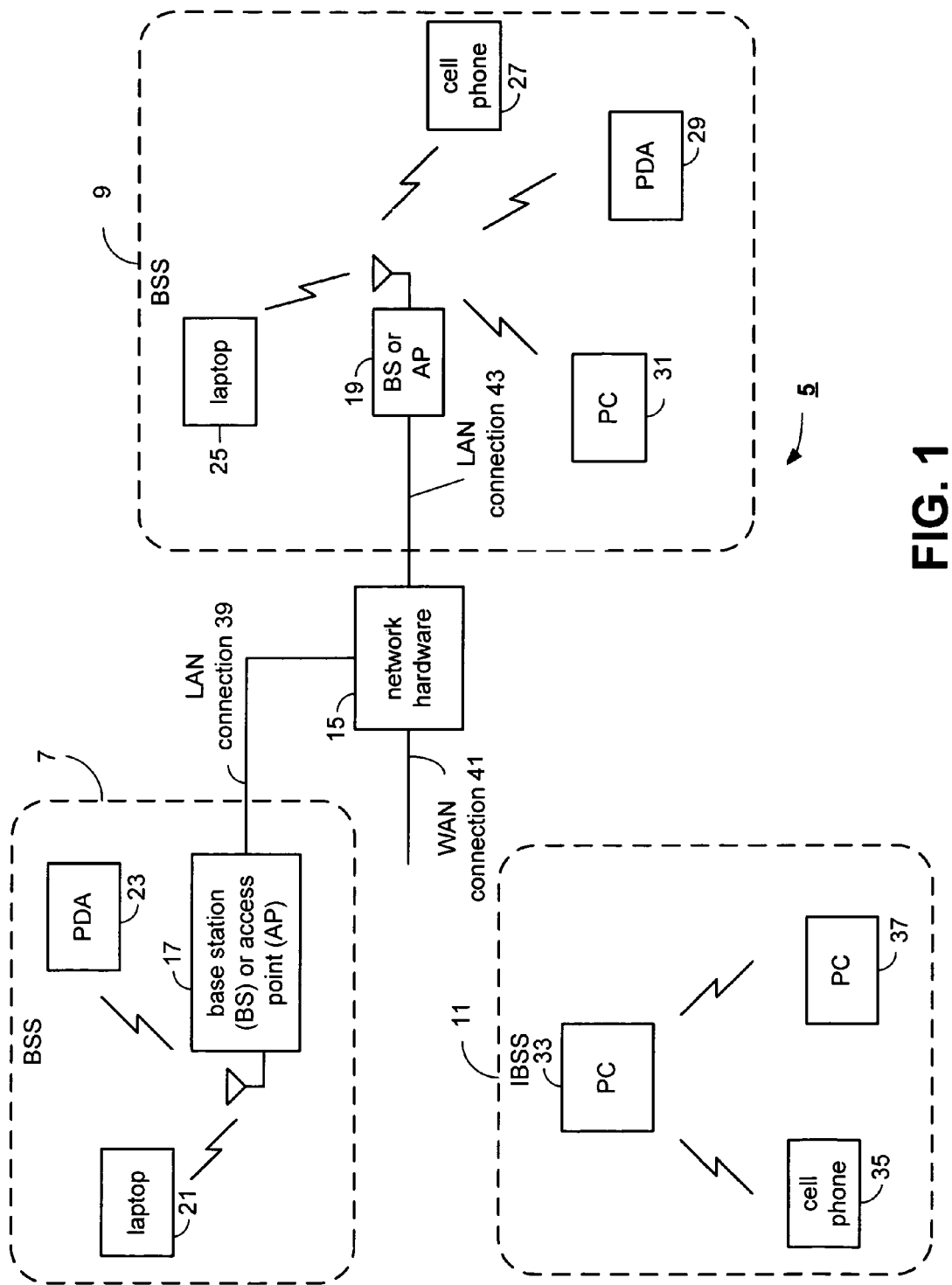
FIG. 1 is a schematic block diagram illustrating a wireless communication system in accordance with the present invention.

FIG. 1 is a schematic block diagram illustrating a communication system 5 that includes basic service set (BSS) areas 7 and 9, an independent basic service set (IBSS) 11, and a network hardware device 15. Each of the BSS areas 7 and 9 include a base station and/or access point 17, 19 and a plurality of wireless communication devices 21-23, 25-31. The IBSS 11 includes a plurality of wireless communication devices 33-37. Each of the wireless communication devices 21-37 may be laptop host computers 21 and 25, personal digital assistant hosts 23 and 29, personal computer hosts 31 and 33, and/or cellular telephone hosts 27 and 35.

The base stations or access points 17 and 19 are operably coupled to the network hardware 15 via local area network connections 39 and 43. The network hardware 15, which may be a router, switch, bridge, modem, system controller, et cetera, provides a wide area network connection 41 for the communication system 5. Each of the base stations or access points 17, 19 has an associated antenna or antenna array to communicate with the wireless communication devices in its area. Typically, the wireless communication devices register with a particular base station or access point 17, 19 to receive services from the communication system 5. For direct connections (i.e., point-to-point communications) within IBSS 11, wireless communication devices 33-37 communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver to facilitate direct and/or in-direct wireless communications within the communication system 5.

Figure 2:
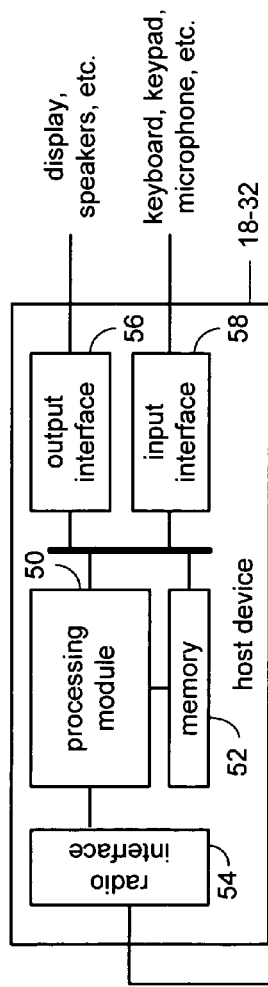
FIG. 2 is a schematic block diagram illustrating a wireless communication device in accordance with the present invention.
Figure 2:
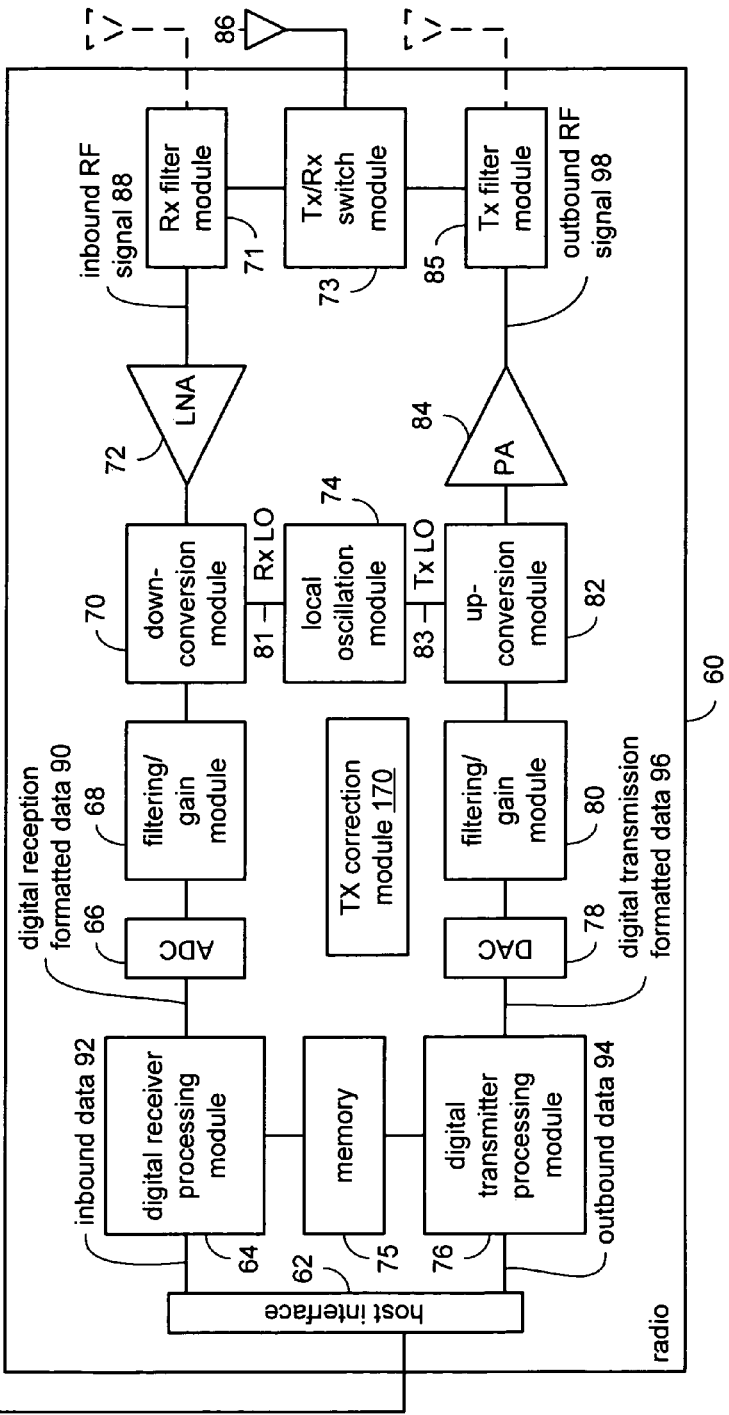

FIG. 2 is a schematic block diagram illustrating a wireless communication device that includes a host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes at least a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, analog-to-digital converter 66, filtering/gain module 68, down conversion module 70, low noise amplifier 72, local oscillation module 74, memory 75, digital transmitter processing module 76, digital-to-analog converter 78, filtering/gain module 80, up-conversion module 82, power amplifier 84, and an antenna 86. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, IEEE 802.11g, IEEE 802.11n, IEEE 802.15, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84 amplifies the RF signal to produce outbound RF signal 98. The antenna 86 transmits the outbound RF signal 98 to a targeted device such as a base station, an access point, and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provide the amplified inbound RF signal to the down conversion module 70, which directly converts the amplified inbound RF signal into an inbound low IF signal (or baseband signal) based on a receiver local oscillation provided by local oscillation module 74. The down conversion module 70 provides the inbound low IF signal (or baseband signal) to the filtering/gain module 68, which filters and/or adjusts the gain of the signal before providing it to the analog to digital converter 66.

The analog-to-digital converter 66 converts the filtered inbound low IF signal (or baseband signal) from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

Figure 3:
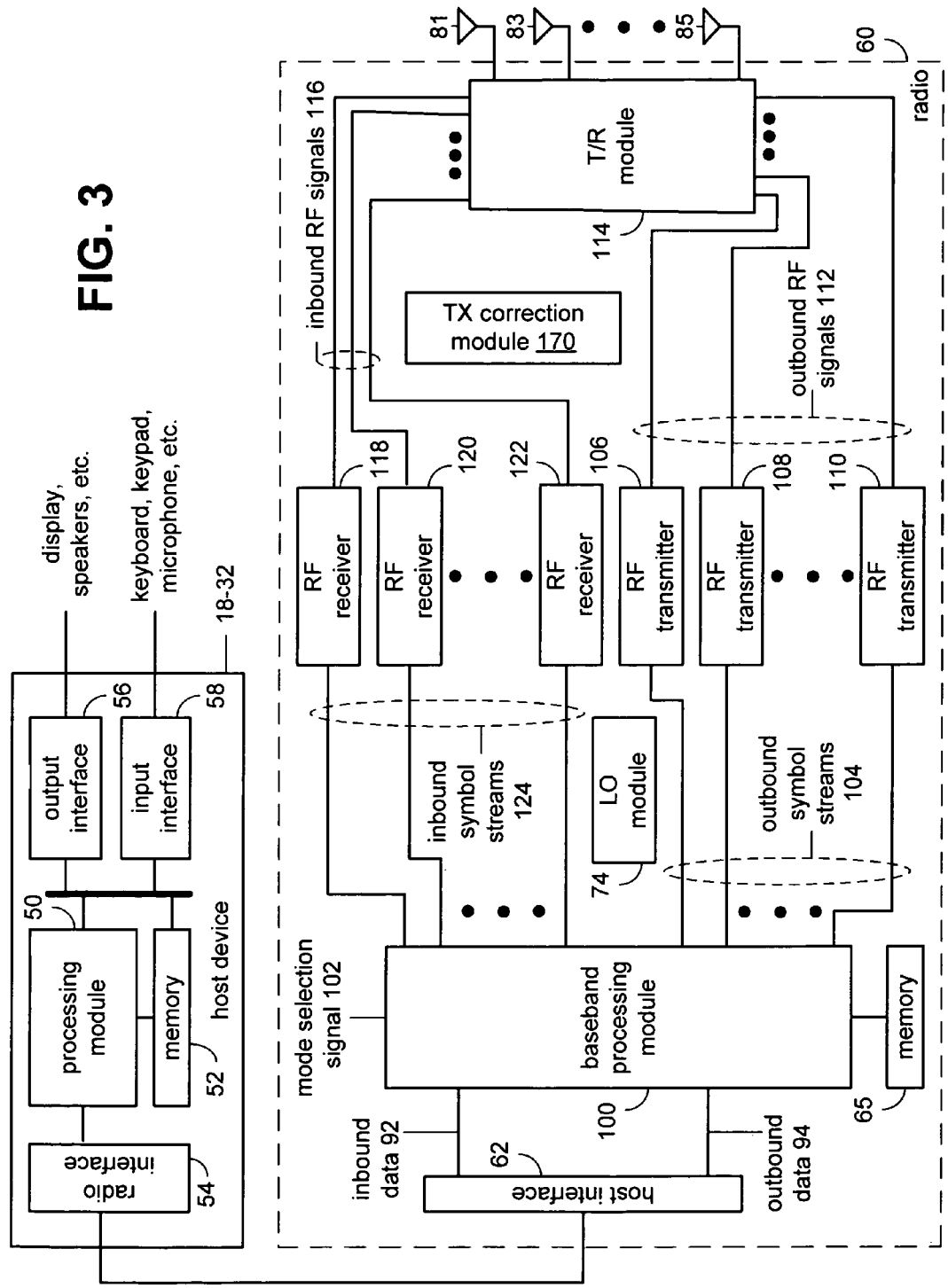
FIG. 3 is a schematic block diagram illustrating another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58, and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions may include, but are not limited to, digital intermediate frequency to baseband conversion, demodulation, constellation demapping, decoding, de-interleaving, fast Fourier transform, cyclic prefix removal, space, and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3, or 4 antennas, the baseband processing module 100 will produce 2, 3, or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
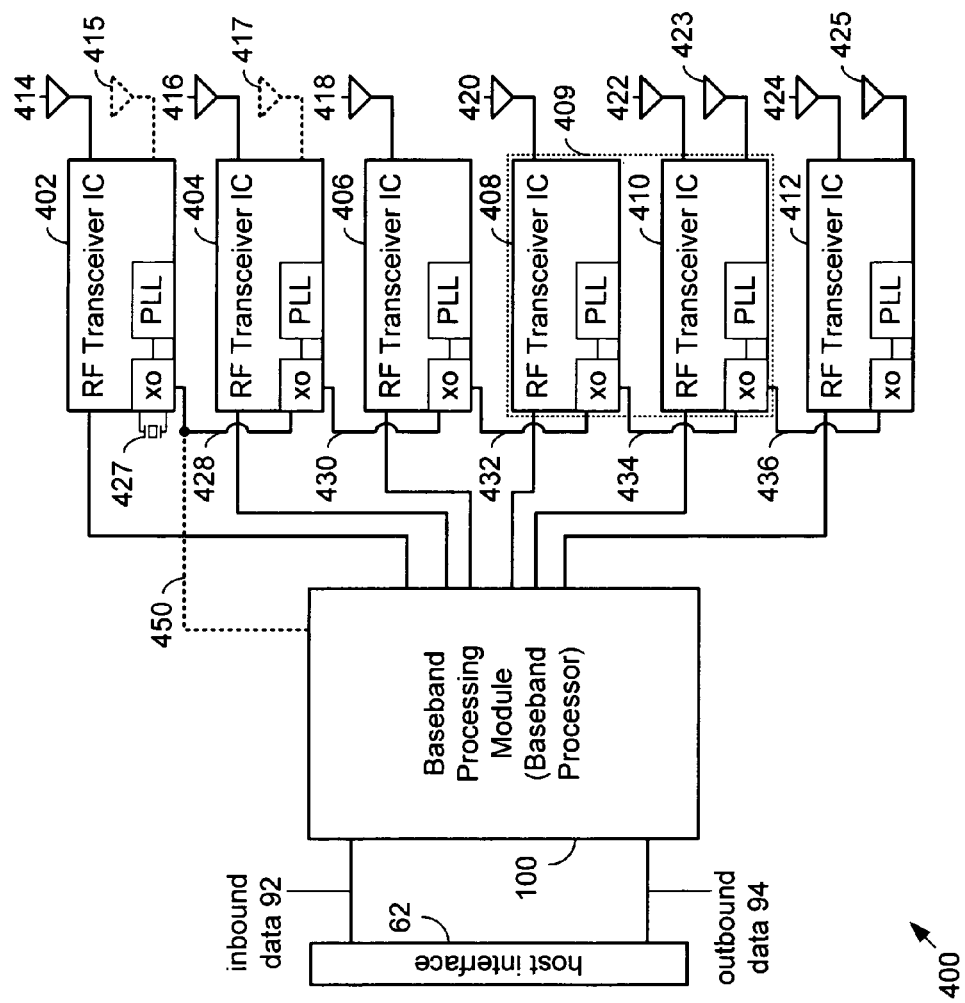
FIG. 4 is a schematic block diagram illustrating a Multiple Input Multiple Output (MIMO) Radio Frequency (RF) transceiver system in accordance with a first embodiment of the present invention.

FIG. 4 is a schematic block diagram illustrating a Multiple Input Multiple Output (MIMO) Radio Frequency (RF) transceiver system 400 in accordance with a first embodiment of the present invention. The MIMO RF transceiver system 400 includes a plurality of RF transceiver ICs 402, 404, 406, 408, 410, and 412. Some of the RF transceiver ICs, e.g., 408 and 408, may be formed on a single semi conductive substrate IC 409. Generally, a first RF transceiver IC 402 is shown as well as at least one other RF transceiver IC 404-412. The MIMO RF transceiver system 400 may further include a baseband processor 100 that couples to a host interface 62 to transmit inbound data 92 and outbound data 94 there between. One of the RF transceiver ICs, e.g., 402 may provide a clock input 450 to the baseband processor 100. The host interface 62 and baseband processor 100 exchange inbound data 92 and outbound data 94 as was previously described with reference to FIGS. 2 and 3.

The MIMO RF transceiver system 400 of the embodiment of FIG. 4 includes at least two RF transceiver ICs, e.g. 402 and 404. These principles may be extended to any number of RF transceiver ICs, e.g., 402-412 and beyond. Antennas 414-420 service RF transceiver ICs 402-408. Some of the RF transceiver ICs of FIG. 4 may include multiple RF transmitters and multiple RF receiver serviced by multiple antennas. For example, RF transceiver IC 410 includes multiple transmitters and multiple receivers that are serviced by antennas 422 and 423. Likewise, RF transceiver IC 412 is serviced by antennas 424 and 425 and includes multiple RF transmitters and multiple RF receivers. As was previously described with reference to FIG. 3, the antennas 414-425 couple to RF transmitter and receiver circuitries of the RF transceiver ICs 402-412 via transmit/receive switches (not shown). FIGS. 4-7 illustrate components of RF transceiver ICs 402-412 required to describe the principles of the present invention. Of course, these RF transceiver ICs 402-412 will include additional components that are not described with reference to FIGS. 4-7. The structure of these RF transceiver ICs 402-412 relates to the details previously described with reference to FIG. 3.

Each of the plurality of RF transceiver ICs 402-412 includes crystal oscillator circuitry (X0). Further, each of the plurality of RF transceiver ICs 402-412 may include a phase locked loop (PLL). The MIMO RF transceiver system 400 of FIG. 4 further includes a crystal 427 coupled to the first RF transceiver IC 402. The crystal 427 and crystal oscillator circuitry of the first RF transceiver IC 402 is operable to produce a master oscillation. Master oscillation coupling 428 between the first RF transceiver IC 402 and a second RF transceiver IC 404 couples the master oscillation produced by the first RF transceiver IC 402 to the second RF transceiver IC 404. Crystal oscillator circuitry of the second RF transceiver IC 404 is operable to produce a slave oscillation based upon the master oscillation 428.

Slave oscillation coupling 430, 432, 434, and 436 couples slave oscillations produced by RF transceiver ICs 404-410 to RF transceiver ICs 406-412, respectively. As will be described further with reference to FIG. 5, crystal oscillator circuitry of RF transceivers ICs 406-412 receives slave oscillations and produce local slave oscillations based upon the received slave oscillations.

Thus, for example, the master oscillation produced by the first RF transceiver IC 402 is coupled to the second RF transceiver IC 404. Crystal oscillator circuitry of the second RF transceiver IC 404 is operable to produce a first slave oscillation based upon the master oscillation. Slave oscillation coupling 430 between the second RF transceiver IC 404 and the third RF transceiver IC 406 is operable to couple the first slave oscillation from the second RF transceiver IC 404 to the third RF transceiver IC 406. The third RF transceiver IC 406 is operable to produce a second slave oscillation based upon the first slave oscillation. The third slave oscillation may then be passed along to the fourth RF transceiver IC 408 via second slave oscillation coupling 432. Further, slave oscillation coupling 434 and 436 is operable to couple slave oscillations produced by a previous RF transceiver IC in the chain to a subsequent RF transceiver IC in the chain. Because all slave oscillations are based upon the master oscillation produced by the crystal oscillator circuitry of the RF transceiver IC 402, the MIMO RF transceiver system 400 is able to produce transmits signal and operate upon received signals in a very time align fashion.

Figure 5:
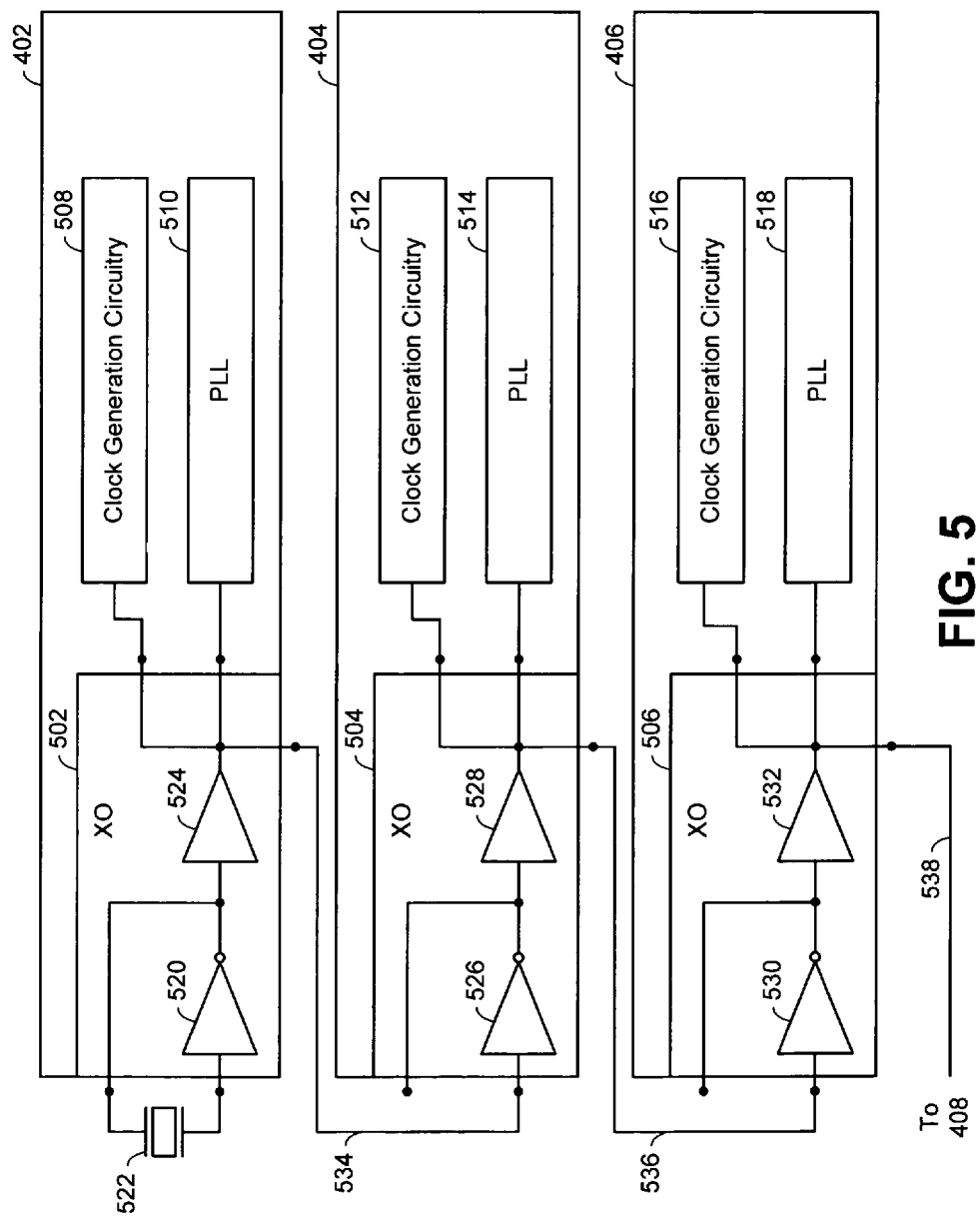
FIG. 5 is a schematic block diagram illustrating a portion of the MIMO RF transceiver system of FIG. 4.

FIG. 5 is a schematic block diagram illustrating a portion of the MIMO RF transceiver system of FIG. 4. Some of the components of the first RF transceiver IC 402, the second RF transceiver IC 404, and the third RF transceiver IC 406 are illustrated in FIG. 4. As shown, the first RF transceiver IC 402 includes a crystal oscillator 502, a PLL 510, and clock generation circuitry 508. Further, the second RF transceiver IC 404 includes crystal oscillator circuitry 504, a PLL 514, and clock generation circuitry 512. Finally, the third RF transceiver IC 406 includes crystal oscillator circuitry 506, a PLL 518, and clock generation circuitry 516.

Referring particularly to the first RF transceiver IC 402, the crystal oscillator circuitry 502 includes inverter 520 and driver 524. Coupled across the input and output of the inverter 520 is the crystal 522. When the crystal oscillator circuitry 502 is powered, the combination of the crystal 522 and the inverter 520 of the crystal oscillator circuitry 502 operates to produce the master oscillation at the output of the inverter 520. This master oscillation is driven by driver 524 to produce driven copy/copies of the master oscillation. The master oscillation produced by driver 524 of the crystal oscillator circuitry 502 of the first RF transceiver IC 404 is provided to clock generation circuitry 508 and PLL 510 of the first RF transceiver IC 402. The master oscillation is also provided as an output of the RF transceiver IC 402 at the crystal oscillator circuitry 502.

The master oscillation coupling 534 couples the master oscillation to the input of inverter 526 of the crystal oscillator circuitry 504 of the second RF transceiver IC 404. Coupled to the output of the inverter 526 is a driver 528 that produces a first slave oscillation based upon the master oscillation received by inverter 526 via master oscillation coupling 534. The first slave oscillation is provided to the clock generation circuitry 512 and the PLL 514 of second RF transceiver IC 404. The first slave oscillation is also provided as an output of the RF transceiver IC 404.

Slave oscillation coupling 536 between the second RF transceiver IC 404 and the third RF transceiver IC 406 couples the first slave oscillation produced by the second RF transceiver IC 404 to the input of inverter 530 of the crystal oscillator circuitry 506 of the third RF transceiver IC 406. Resultantly, inverter 530 produces a second slave oscillation at its output which is based upon the first slave oscillation. Driver 532 of crystal oscillator circuitry 506 drives the second slave oscillation, which is received by clock generation circuitry 516 and PLL 518 of the third RF transceiver IC 406. The second slave oscillation is also provided as an output of the third RF transceiver IC 406. Second slave oscillation coupling 538 couples the second slave oscillation to the fourth RF transceiver IC 408 of FIG. 4.

Figure 6:
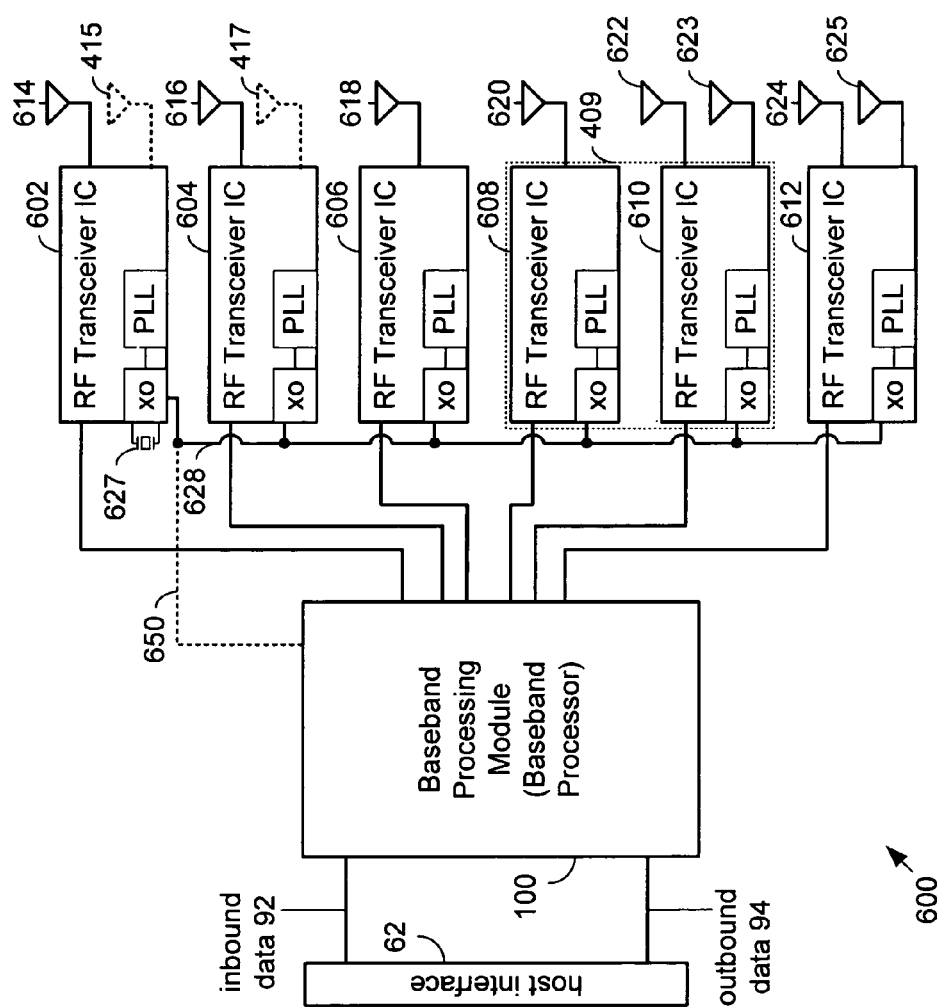
FIG. 6 is a schematic block diagram illustrating a MIMO Radio Frequency (RF) transceiver system in accordance with a second embodiment of the present invention.

FIG. 6 is a schematic block diagram illustrating a MIMO Radio Frequency (RF) transceiver system in accordance with a second embodiment of the present invention. The MIMO RF transceiver system 600 includes RF transceiver ICs 602-612 and antennas 614-625. Some of the RF transceiver ICs, e.g., 608 and 608, may be formed a single semi conductive substrate 609. The MIMO RF transceiver system 600 may further include a baseband processor 100 that couples to a host interface 62 to transmit inbound data 92 and outbound data 94 there between. One of the RF transceiver ICs, e.g., 602 may provide a clock input to the baseband processor 100. The host interface 62 and baseband processor 100 exchange inbound data 92 and outbound data 94 as was previously described with reference to FIGS. 2 and 3.

The plurality of RF transceiver ICs 602-612 includes a first RF transceiver IC 602 and at least one other RF transceiver IC, e.g., plurality of RF transceiver ICs 604-612. Each of the plurality of RF transceiver ICs 602-612 includes crystal oscillator circuitry. As was the case with the teachings of FIG. 4, with the teachings of FIG. 6, the plurality of RF transceiver integrated circuits includes at least two RF transceiver ICs. However, the total number of RF transceiver ICs that may be supported according to the embodiment of the present invention of FIG. 6 is limited only by the dimension of the MIMO RF transceiver system 600 and the overall requirement of such system.

A crystal 627 couples to the first RF transceiver IC 602. The crystal 627 and crystal oscillator circuitry of the first transceiver IC 602 is operable to produce a master oscillation. Master oscillation coupling 628 between the first RF transceiver IC 602 and a second RF transceiver IC 604 is operable to couple the master oscillation from the first transceiver IC 602 to the second RF transceiver IC 604. The second RF transceiver IC 604 is operable to produce a first slave oscillation based upon the master oscillation.

As distinguished from the embodiment of FIG. 4, with the embodiment of the MIMO RF transceiver system 600 of FIG. 6, the master oscillation coupling couples the master oscillation from the first RF transceiver IC 602 to each other RF transceiver IC 604-612 of the MIMO RF transceiver system 600. Thus, each of the second RF transceiver IC 604 through the sixth RF transceiver IC 612 receives the master oscillation from the first RF transceiver IC 602. Using respective crystal oscillator circuitry, each of the RF transceiver ICs 602-612 generates a local slave oscillation based upon the master oscillation.

Figure 7:
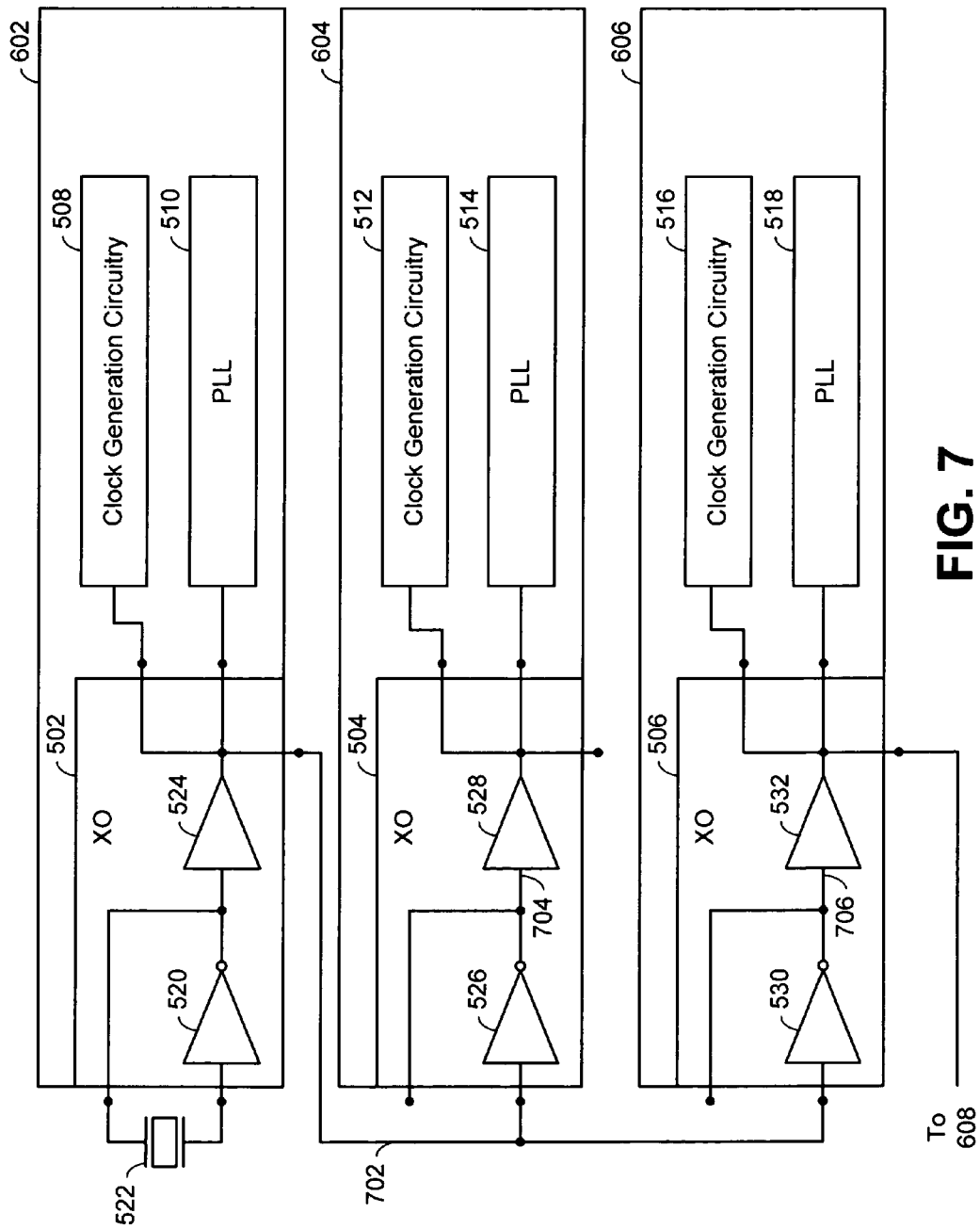
FIG. 7 is a schematic block diagram illustrating a portion of the MIMO RF transceiver system of FIG. 6.

FIG. 7 is a schematic block diagram illustrating a portion of the MIMO RF transceiver system of FIG. 6. Referring now to FIG. 7, the first RF transceiver IC 602, second transceiver IC 604, and third RF transceiver 606 are shown. Each of these RF transceiver ICs 602-606 includes components previously described with reference to FIGS. 2, 3, and 5. However, the connectivity of the master oscillation coupling 702 of FIG. 7 differs from that of FIG. 5. In particular, master oscillation coupling 702 of FIG. 7 couples master oscillation produced by driver 524 of first RF transceiver IC 602 not only to the inverter 526 of second RF transceiver IC 604 but to the inverter 530 of crystal oscillator circuitry 506 of the third RF transceiver IC 606. Thus, with the embodiment of FIG. 7, each of the crystal oscillator circuitries 504 and 506 of RF transceiver ICs 604 and 606 produces a local slave oscillation based upon the master oscillation.

As one of ordinary skill in the art will appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled." As one of ordinary skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a phase locked loop with power distribution that reduces noise generated by the phase locked loop. By reducing noise within the phase locked loop, the phase locked loop may be used within a local oscillation generator to reduce noise therein. As one of ordinary skill in the art will appreciate, other embodiments may be derived from the teaching of the present invention without deviating from the scope of the claims.

The invention claimed is:

1. A Multiple Input Multiple Output (MIMO) Radio Frequency (RF) transceiver system comprising:
   a plurality of RF transceiver Integrated Circuits (ICs) including a first RF transceiver IC and at least one other RF transceiver IC, each of the plurality of RF transceiver ICs including crystal oscillator circuitry;
   a crystal coupled to the first RF transceiver IC, the crystal and crystal oscillator circuitry of the first RF transceiver IC operable to produce a master oscillation;
   a master oscillation coupling between the first RF transceiver IC and the at least one other RF transceiver IC, the master oscillation coupling operable to couple the master oscillation from the first RF transceiver IC to each other RF transceiver IC of the at least one other RF transceiver IC; and wherein the crystal oscillator circuitry of the each other RF transceiver IC is operable to produce a corresponding slave oscillation based upon the master oscillation.

2. The MIMO RF transceiver system of claim 1, wherein:
the first RF transceiver IC further includes a Phase Locked Loop (PLL) that receives the master oscillation; and
the at least one other RF transceiver IC further includes a PLL that receives a locally produced slave oscillation produced by the at least one other RF transceiver IC from the master oscillation.

3. The MIMO RF transceiver system of claim 1, wherein:
the first RF transceiver IC further includes clock generation circuitry that receives the master oscillation and that produces a master clock signal based upon the master oscillation; and
the at least one other RF transceiver IC further includes clock generation circuitry that receives a locally produced slave oscillation and that produces a second slave clock signal based upon the locally produced slave oscillation.

4. The MIMO RF transceiver system of claim 1, further comprising at least one baseband processor communicatively coupled to the plurality of RF transceiver ICs.

5. The MIMO RF transceiver system of claim 1:
wherein the master oscillation coupling is operable to couple the master oscillation from the first RF transceiver IC to a second RF transceiver IC of the at least one other RF transceiver IC;
wherein crystal oscillator circuitry of the second RF transceiver IC is operable to produce a second slave crystal oscillation based upon the master oscillation; and
further including a second slave oscillation coupling between the second RF transceiver IC and a third RF transceiver IC of the at least one other RF transceiver IC that is operable to couple the second slave oscillation from the second RF transceiver IC to the third RF transceiver IC; and
wherein crystal oscillator circuitry of the third RF transceiver IC is operable to produce a third slave oscillation based upon the second slave oscillation.

6. The MIMO RF transceiver system of claim 1, wherein at least one of the plurality of RF transceiver ICs includes multiple RF transmitters and multiple RF receivers.

7. The MIMO RF transceiver system of claim 1, wherein the crystal oscillator circuitry of each RF transceiver IC of the plurality of RF transceiver ICs includes an inverter and at least one driver.

8. A Multiple Input Multiple Output (MIMO) Radio Frequency (RF) transceiver system comprising:
a plurality of RF transceiver Integrated Circuits (ICs) including a first RF transceiver IC and at least one other RF transceiver IC, each of the plurality of RF transceiver ICs including crystal oscillator circuitry;
a crystal coupled to the first RF transceiver IC, the crystal and crystal oscillator circuitry of the first RF transceiver IC operate to produce a master oscillation;
master oscillation coupling between the first RF transceiver IC and a second RF transceiver IC of the at least one other RF transceiver IC, the master oscillation coupling operable to couple the master oscillation from the first RF transceiver IC to each other RF transceiver IC of the plurality of RF transceiver ICs, including the second RF transceiver IC; and
wherein the crystal oscillator circuitry of the each other RF transceiver IC is operable to produce a corresponding slave oscillation based upon the master oscillation.

9. The MIMO RF transceiver system of claim 8, wherein:
the first RF transceiver IC further including a Phase Locked Loop (PLL) that receives the master oscillation; and
the each other RF transceiver IC of the at least one other RF transceiver IC further including a PLL that receives a locally produced crystal oscillation.

10. The MIMO RF transceiver system of claim 8, wherein:
the first RF transceiver IC further including clock generation circuitry that receives the master oscillation; and
the each other RF transceiver IC of the at least one other RF transceiver IC further including clock generation circuitry that receives a locally produced slave oscillation.

11. The MIMO RF transceiver system of claim 8, further comprising at least one baseband processor communicatively coupled to the plurality of RF transceiver ICs.

12. A method for operating a Multiple Input Multiple Output (MIMO) Radio Frequency (RF) transceiver system that includes a plurality of RF transceiver Integrated Circuits (ICs) having a first RF transceiver Integrated Circuit (IC) and at least one other RF transceiver IC, each of the plurality of RF transceiver ICs including crystal oscillator circuitry, the method comprising:
the first RF transceiver IC producing a master oscillation using its crystal oscillator circuitry and a crystal coupled thereto;
coupling the master oscillation from the first RF transceiver IC to each other of the at least one other RF transceiver IC of the plurality of RF transceiver ICs; and
the each of the at least one other RF transceiver IC producing a corresponding slave oscillation based upon the master oscillation of the first RF transceiver IC using respective crystal oscillator circuitry.

13. The method of claim 12:
wherein the coupling the master oscillation from the first RF transceiver IC to the at least one other RF transceiver IC includes coupling the master oscillation from the first RF transceiver IC to a second RF transceiver IC;
wherein the at least one other RF transceiver IC producing a slave oscillation based upon the master oscillation using respective crystal oscillator circuitry includes the second RF transceiver IC producing a corresponding first slave oscillation based upon the master oscillation;
further including coupling the first slave oscillation from the second RF transceiver IC to a third RF transceiver IC of the at least one other RF transceiver IC; and
further including the third RF transceiver IC producing a second slave oscillation based upon the first slave oscillation.

14. The method of claim 12:
wherein coupling the master oscillation from the first RF transceiver IC to the at least one other RF transceiver IC comprises coupling the master oscillation from the first RF transceiver IC to each of the at least one other RF transceiver IC; and
wherein the at least one other RF transceiver IC producing a corresponding slave oscillation based upon the master oscillation including the each of the other RF transceiver IC producing a corresponding slave oscillation based upon the master oscillation.

* * * * *